United States Patent [19]
Connors et al.

[11] Patent Number: 5,627,658
[45] Date of Patent: May 6, 1997

[54] AUTOMATIC NETWORKED FACSIMILE QUEUING SYSTEM

[75] Inventors: Thomas W. Connors, Rochester; Andrew J. Aikens, Webster, both of N.Y.

[73] Assignee: Xerox Corporation, Stamford, Conn.

[21] Appl. No.: 355,769

[22] Filed: Dec. 14, 1994

[51] Int. Cl.⁶ .................................................. H04N 1/32
[52] U.S. Cl. ........................ 358/407; 358/468; 395/114
[58] Field of Search ................................... 395/112, 114, 395/101, 163, 505, 506, 200.01, 200.02, 200.08, 200.09, 200.1, 200.12, 200.15, 200.2, 828, 882, 892, 280; 358/444, 468, 437, 402, 403, 407, 296, 442, 404, 434, 435, 436, 438, 439, 440; 346/154; 347/142; 400/71; 379/100, 96, 97, 98; 348/14

[56] References Cited

U.S. PATENT DOCUMENTS

| | | | |
|---|---|---|---|
| 3,597,071 | 7/1971 | Jones | 355/202 |
| 4,623,244 | 11/1986 | Andrews et al. | 355/24 |
| 4,947,345 | 8/1990 | Paradise et al. | 358/442 |
| 5,021,892 | 6/1991 | Kita et al. | 358/468 |
| 5,038,218 | 8/1991 | Matsumoto | 358/296 |
| 5,128,878 | 7/1992 | Gore et al. | 395/162 |
| 5,179,637 | 1/1993 | Nardozzi | 395/114 |
| 5,271,065 | 12/1993 | Rourke et al. | 382/112 |
| 5,287,194 | 2/1994 | Lobiondo | 358/296 |

*Primary Examiner*—Edward L. Coles, Sr.
*Assistant Examiner*—Dov Popovici
*Attorney, Agent, or Firm*—Mark Costello

[57] ABSTRACT

A plurality of multifunction devices each having a facsimile function are connected together in a networking arrangement. Upon receipt of a job requiring a facsimile function, such a device initially checks its queues to determine whether there are any current facsimile jobs in the queues which would delay the transmission of the just-received job. If there are none, the job is transmitted in accordance with the device job priority control arrangement. If prior facsimile jobs are present in the queue, the device checks, via its network connection, other networked devices having facsimile capability from a preprogrammed list thereof, to determine whether any of the devices are not busy. In such a case, the job, with facsimile control instruction and data, is transferred to the non-busy facsimile for transmission.

18 Claims, 5 Drawing Sheets

AUTOMATIC NETWORKED FACSIMILE QUEUING SYSTEM

CROSS REFERENCE

Cross reference is made to U.S. patent application Ser. Nos. 08/315,021; 08/315,173; 08/315,277; 08/315,274; D/94194; and D/94688.

The present invention is directed to an improving facsimile transmission in multifunction devices, and more particularly to an automated system useful in multifunction devices for efficiently transmitting facsimile documents from a networked facsimile device.

BACKGROUND OF THE INVENTION

Standard facsimile devices which operate only as facsimile machines connected directly to a telephone line are rapidly being replaced by devices which combined facsimile and/or digital scanning, copying and printing in one single unit. Note, e.g., U.S. Pat. No. 4,947,345 to Paradise; U.S. Pat. No. 3,597,071 to Jones; U.S. Pat. No. 5,038,218 to Matsumoto; U.S. Pat. No. 5,021,892 to Kita, et al.; and U.S. Pat. No. 4,623,244 to Andrews, et al. Such devices can take advantage of network connections so that they can be effectively used by a wide group of users as a department printer or facsimile machine. Even in such an environment however, a single multifunction machine will continue to have only a single or, at most, a limited number of external telephone ports.

When a multifunction machine is utilized by a significant number of users, the probability of more than one individual directing a job (some work process utilizing copying, printing, scanning or transmitting capability of the device) to the machine is greatly increased, requiring a method of handling the queue of multiple jobs that is formed. There are many ways to prioritize queues, based on time of receipt, job-type, available resources, user codes, etc. U.S. Pat. No. 4,947,345 to Paradise, et al. shows one prioritization scheme, which assumes that facsimile messages are usually very important and should receive high priority in the job queues requiring utilizing the printer.

Generally speaking, transmission of documents across networks utilized by remote terminals are known, for example, as shown by examples of recent patents relating to network environments of plural remote terminals shared by users, including but not limited to Xerox Corporation U.S. Pat. No. 5,243,518; U.S. Pat. No. 5,226,112; U.S. Pat. No. 5,170,340 and U.S. Pat. No. 5,287,194. Some patents on this subject by others include U.S. Pat. No. 5,113,355, U.S. Pat. No. 5,113,494 (originally filed Feb. 27, 1987), U.S. Pat. No. 5,181,162, U.S. Pat. No. 5,220,674, U.S. Pat. No. 5,247,670; U.S. Pat. No. 4,953,080 and U.S. Pat. No. 4,821,107. Further, by way of background, some of the following Xerox Corporation patents also include examples of networked systems with printers: U.S. Pat. No. 5,153,577; U.S. Pat. No. 5,113,517; U.S. Pat. Nos. 5,072,412; 5,065,347; 5,008,853; 4,947,345; 4,939,507; U.S. Pat. No. 4,937,036; U.S. Pat. No. 4,920,481; U.S. Pat. No. 4,914,586; U.S. Pat. No. 4,899,136; U.S. Pat. No. 4,063,220; U.S. Pat. No. 4,099,024; U.S. Pat. No. 3,958,088; U.S. Pat. No. 3,920,895; and U.S. Pat. No. 3,597,071. Also noted are IBM Corp. U.S. Pat. No. 4,651,278 and U.S. Pat. No. 4,623,244 (both assigned to IBM), and U.S. Pat. No. 4,760,458 and Japanese Pub. No. 59-63872 published Nov. 4, 1984 (both assigned to Canon). Some of these various above patents also disclose multi-functional or integral machines [digital scanner/facsimile/printer/copiers] and their controls.

Some other network systems related publications include "Xerox System Integration Standard Printing Protocol XSIS 118404", April 1984; "Xerox Integrated Production Publishers Solutions: . . . " Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress™: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell" Netware®, 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted among commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet™"; and the Interpress Electronic Printing Standard, Version 3.0, Xerox System Integration Standard XNSS 048601 (January 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart™" systems, first announced Sep. 13, 1990, are also noted. Current popular commercial published "systems software" including LAN workstation connections includes Novell® DOS 7.0, "Windows™" NT 3.1, and IBM OS/2 Version 2.1. Also noted in the Xerox 7033 LAN FAX server, a facsimile machine with a network connection serving multiple workstations on a LAN network.

U.S. Pat. No. 5,287,194 to Lobiando suggests the desirability of allocating printing jobs to printers on a network based on a function related to job length and queue length. The arrangement assumes that the user has access to the locations at which the printing will occur. Also noted is U.S. Pat. No. 5,128,878 to Gore et al, detailing a scheduling system which utilizes multiple plotters in a network.

As facsimile jobs become longer and more numerous due to the increased reliability and availability of facsimile devices, the facsimile transmission function of a multifunction machine or facsimile machine is "busy" for longer periods of time. Depending on usage, queues of facsimile jobs will be created, causing delays in the transmission of any particular job as it works its way through the queue, even though users will believe that the job was sent. However, U.S. Pat. No. 4,947,345 to Paradise, et al. does not address the problem of long waits to send facsimile jobs, even assuming that facsimile jobs are given high priority.

Common practice provides that a user seeking to send a document to a remote location facsimile must positively select which facsimile machine to use to send the document. However, a user really has little interest in which machine actually transmits the document.

References disclosed herein are incorporated by reference for their teachings.

SUMMARY OF THE INVENTION

The present invention is directed to a networked facsimile system, in which a plurality of networked facsimile devices exchange facsimile jobs in their respective queues, to optimize outgoing transmission of facsimile documents.

In accordance with one aspect of the invention, a plurality of multifunction devices each having a facsimile function are connected together in a networking arrangement. Upon receipt of a job requiring a facsimile function, such a device initially checks its queues to determine whether there are any current facsimile jobs in the queues which would delay the transmission of the just-received document. If there are none, the document is transmitted in accordance with the device job priority control arrangement. If prior facsimile jobs are present in the queue, the device checks, via its network connection, other networked devices having facsimile capability from a preprogrammed list thereof, to determine whether any of the devices are not busy. In such a case, the job, with facsimile control instruction and data, is transferred to the non-busy facsimile for transmission.

In accordance with another aspect of the invention, in a system as described, if all of the networked devices are determined to be busy, a second level inquiry is performed to determine the shortest queue. Upon determining that any queue is shorter than the queue of the original device, the job, with facsimile control instruction and data, is transferred to the non-busy facsimile for transmission.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
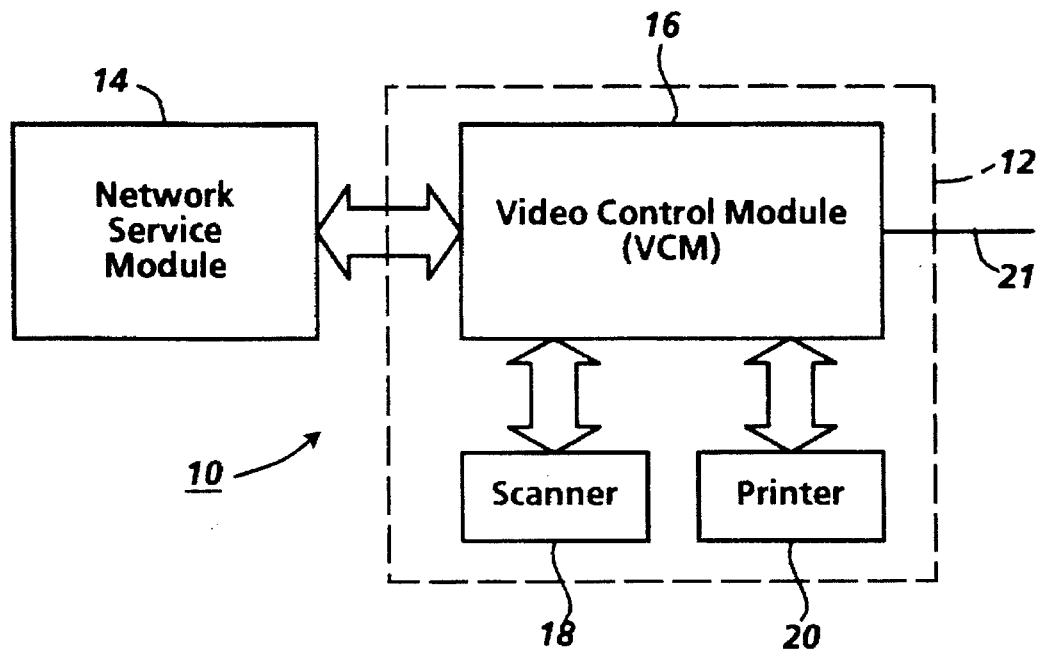
FIG. 1 is a block diagram depicting a multifunctional, network adaptive printing machine.

Referring to FIG. 1, a multifunctional, network adapted printing system is designated by the numeral 10. The printing system 10 includes a printing machine 12 operatively coupled with a network service module 14. The printing machine 12 includes an electronic subsystem 16, referred to as a video control module (VCM), communicating with a scanner 18, a printer 20 and an external telephone line 21. In one example, VCM 16, which will be described in further detail below, coordinates the operation of the scanner and printer in a digital copying arrangement. In one possible scanning arrangement, scanner 18 (also referred to as image input terminal (IIT)) reads an image on an original document by using a CCD full width array and converts analog video signals, as gathered, into digital signals. In turn, an image processing system 22 (FIG. 2), associated with scanner 18, executes signal correction and the like, converts the corrected signals into multi-level signals (e.g. binary signals), compresses the multi-level signals and preferably stores the same in electronic precollation (EPC) memory 24.

Referring again to FIG. 1, printer 20 (also referred to as image output terminal (IOT)) preferably includes a xerographic print engine. In a printing context, multi-level image data is read out of the EPC memory 24 (FIG. 2) for printing. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
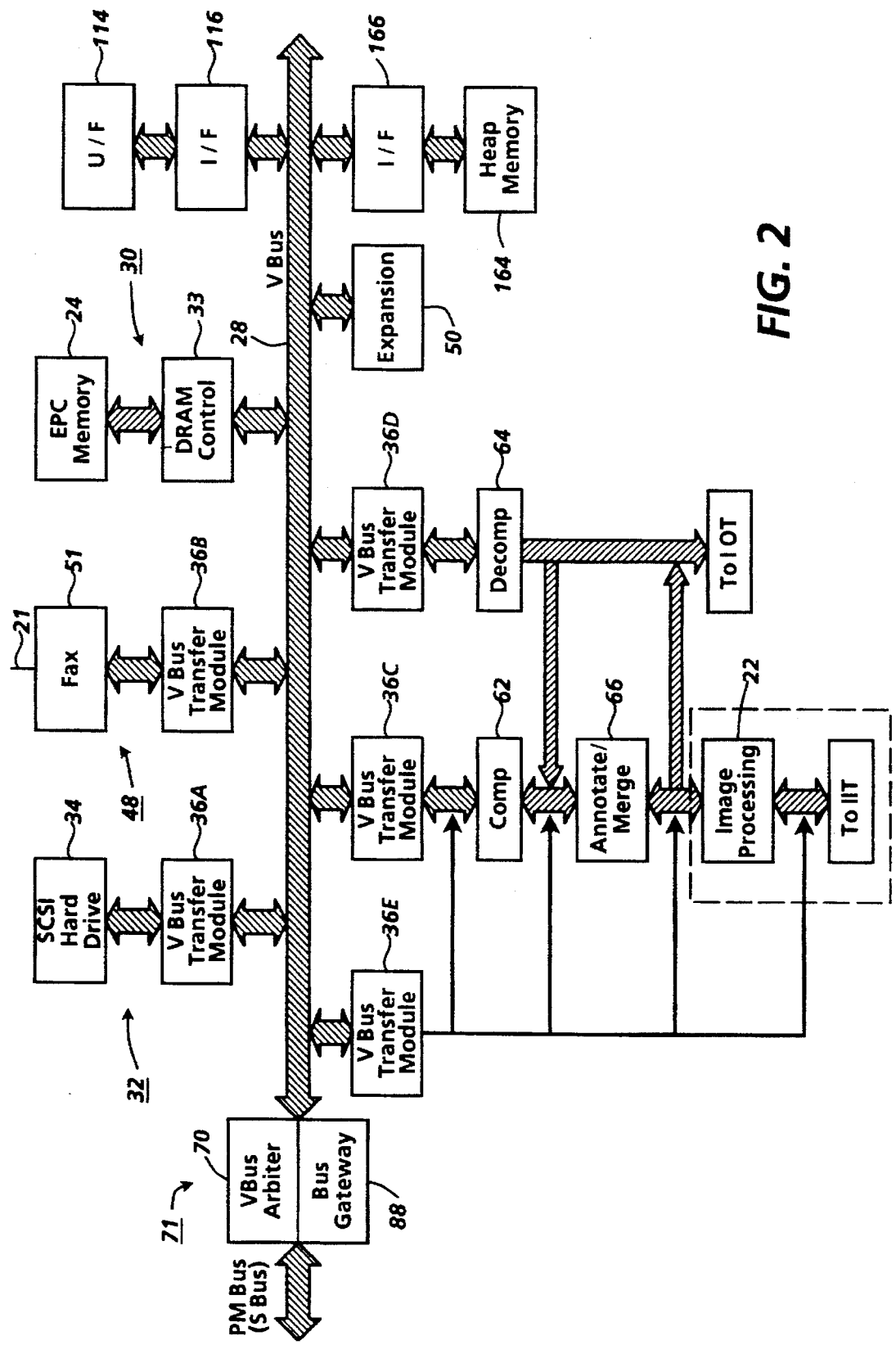
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30, mass memory section 32 and heap memory 116. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g., a workstation) could be coupled to the VBus by way the transfer module 36a through use of a suitable interface and a SCSI line.

Figure 3:
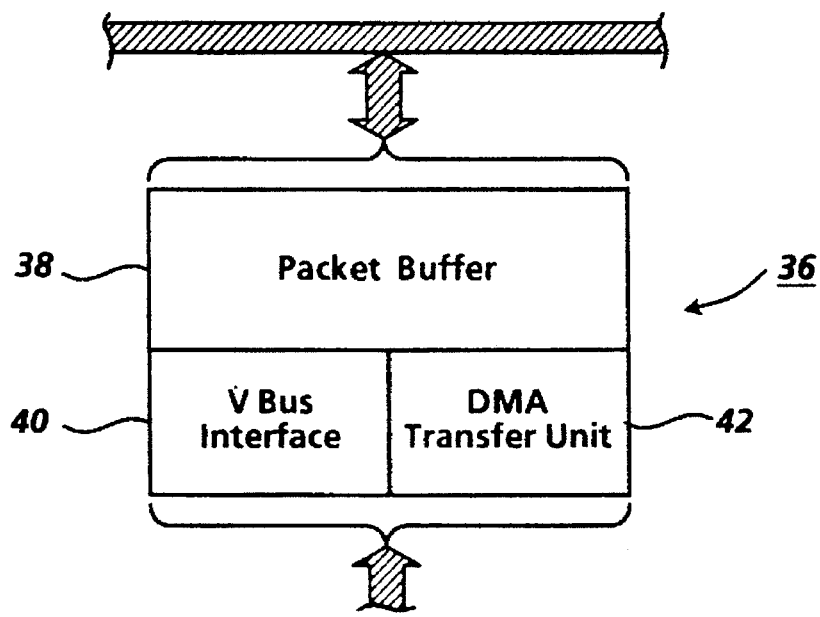
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes. Preferably, the packet size would be reduced four times when the VBus is relatively busy and increased for times when activity on the bus is relatively low.

Figure 5:
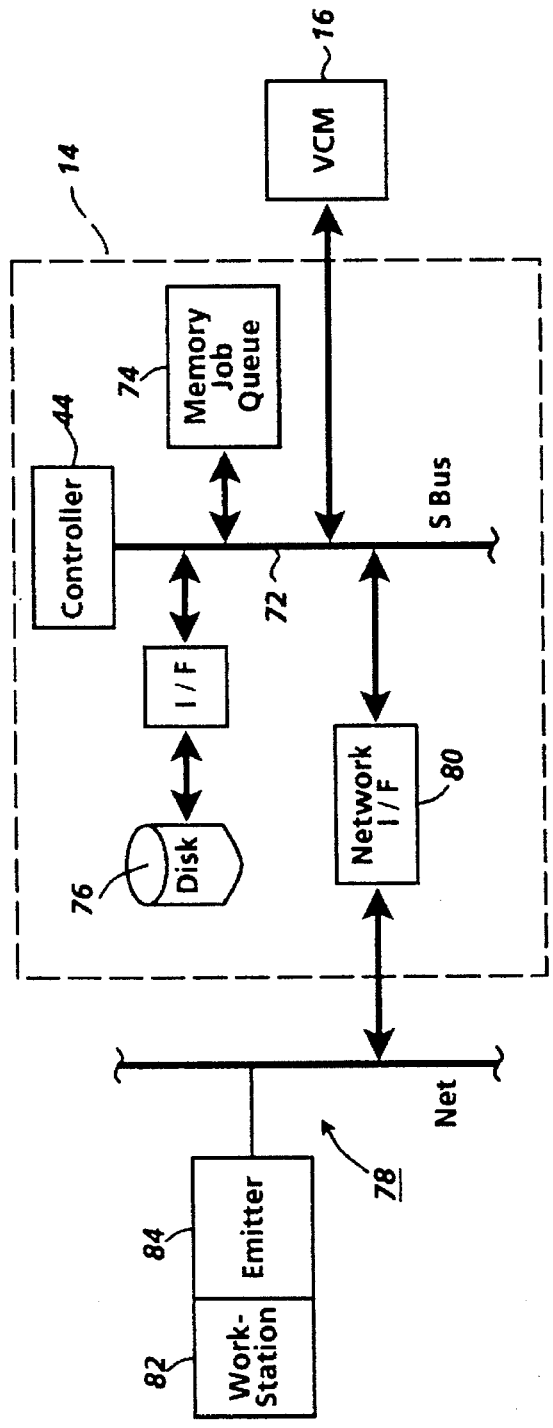
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, the DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
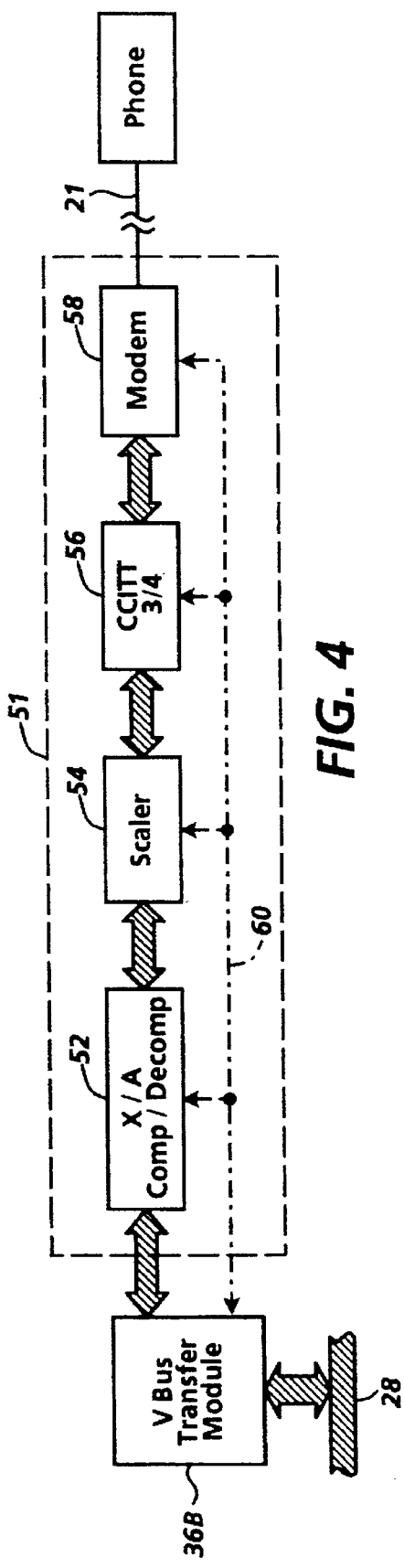
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way of an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of conventional telephone line 21.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by way of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g., FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. In a preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp. The arrangement enables the transfer of jobs and status information via the network.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference to "PostScript® Language Reference Manual", Second Edition, Addison-Wesley Publishing Co. (1990)

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
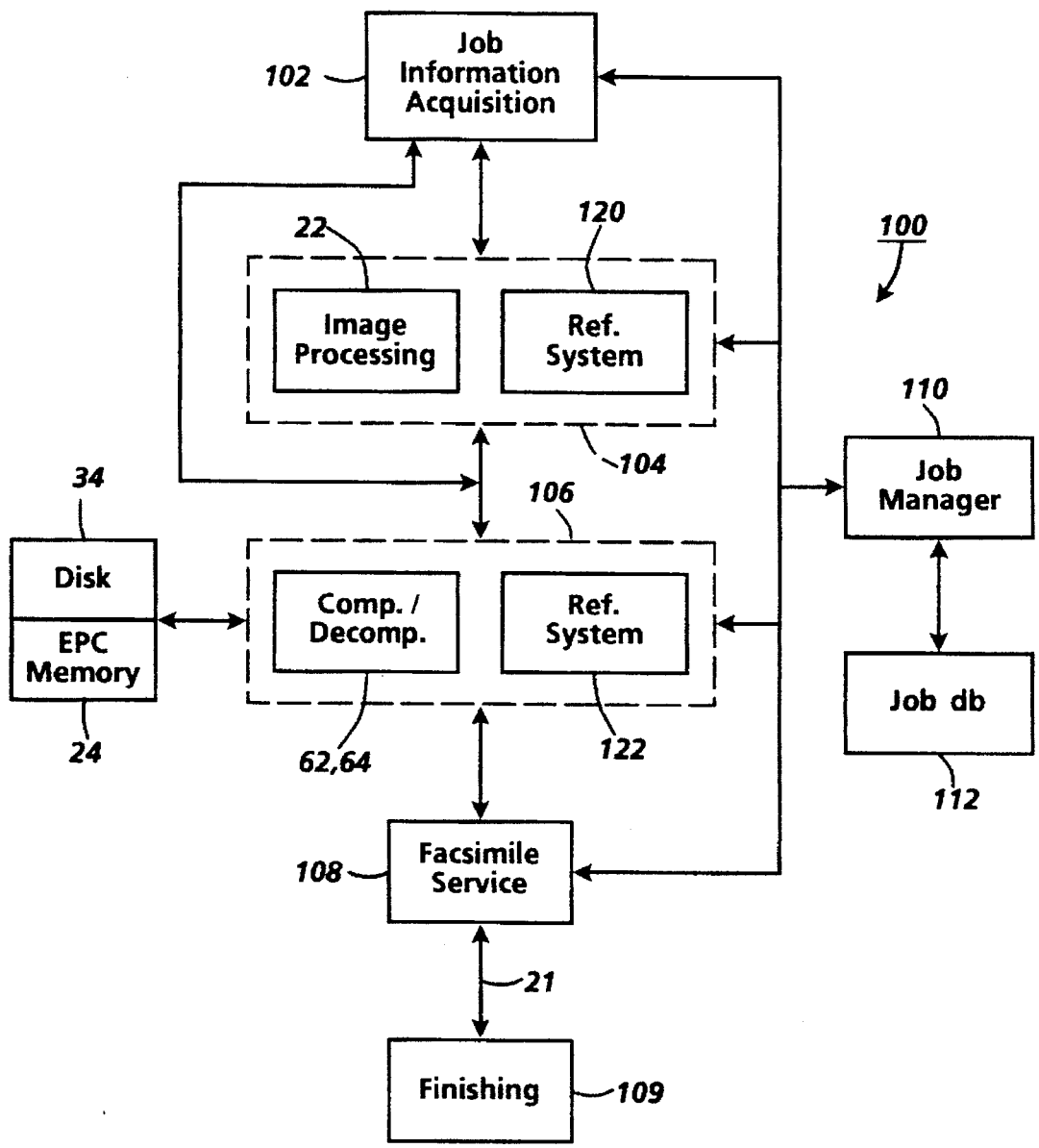
FIG. 6 is a block diagram representing a subsystem of the printing machine of FIG. 2.

Referring to FIG. 6, a model of facsimile operation is provided, designated by the numeral 100. Facsimile system 100, which is suitable for acquiring, and processing a job comprising job attribute information and image data, and transmitting the job in a facsimile format, includes a job acquisition section 102, an image processing service 104, a video service 106, and a fax service 108. Each of the system components 102, 104, 106 and 108 communicates with a job manager or job process 110. The job manager 110 communicates with a job database ("db") 112. The job acquisition preferably includes a user interface ("UI") 114 (FIG. 2), for providing attributes of the job, and one of, among other sources, the scanner 18 (FIG. 1), the workstation 82 (FIG. 5), the fax module 51 (FIG. 4) or other suitable input source, such as a floppy disk or CD-ROM (neither shown), for providing image data of the job.

Preferably, the attributes of the job, such as job level instructions (e.g., destination phone number), page level instructions (e.g., plex and processing related instructions) and other characteristics (sheet size, collation, security) are programmed with the UI 114 (FIG. 2), which UI is coupled with the VBus 28 by way of a suitable UI interface 116. Any suitable UI, such as the UI used with the DocuTech® printing system, would be appropriate for use as UI 114. With a UI, such as the one used by the DocuTech®, job attributes are set in a dialog or job ticket by way of keyboard input or a curser (e.g., "Mouse") technique. A job ticket suitable for use in the present embodiment is disclosed in U.S. Pat. No. 5,271,065 to Rourke et al., the pertinent portions of which are incorporated herein by reference.

The image processing service 104 includes the image processing section 22 (FIG. 2) and an image processing reference system 120. Preferably, the reference system includes one of plural tools necessary to estimate the time required to perform a given image processing operation, such as resolution conversion or image rotation, for a given image. In one example, the reference system 120 comprises a look up table mapping image size with one of plural image processing operations. In another example, an "intelligent" or heuristic algorithm, exploiting experiential data collected by the printing system for previously performed image processing operations is used to provide an estimate for each page to be image processed in the image processing section 22.

The video service 106 includes the compression service 62, the decompression service 64 and the reference system 122. As with the reference system 120, the reference system 122 can use, among other approaches, a look-up table, mapping uncompressed image data quantity against compressed quantity, or an intelligent algorithm in which the reference system determines the compressed size of a given page based on the degree to which the video service has compressed previous pages of comparable size.

The facsimile service 108 includes the facsimile function 51.

The concept of using icons to represent respective facsimile machines on a local area network, with attendant printing properties is embodied in a Xerox® network printing system incorporating, among other components, a 6085 or SunSparc® workstation, Viewpoint® software and a suitable network facsimile machine. Additionally, the facsimile service includes a facsimile manager for controlling the facsimile process of the one or more suitable print engines.

Job manager 110 provides the "brain power" required to obtain a facsimile job ETC. The job manager comprises a process capable of calculating ETCs for each page. The methodology used by the job manager to obtain job ETCs will be discussed in further detail below. The job manager is also responsible for maintaining the database 112. As with the DocuTech printing system, images are stored in memory, such as the EPC memory 24/SCSI Disk 34 and corresponding image identifiers are stored in the database 112. Also, as with the DocuTech printing system, the image identifiers are used during printing to retrieve selected stored images. As further discussed below, the database 112 is employed to store page and job ETCs.

The present estimating technique contemplates at least two approaches for displaying Job ETC. In one approach, certain defaults in the process cause the Job ETC to be displayed after selected events. For example, as indicated above, the Job ETC is displayed automatically after the ETC database is updated in view of consulting the image processing/video services. In some cases, however, a user may wish to have the current Job ETC displayed periodically. In this event, an update timer (not shown) can be activated so that the current Job ETC is displayed periodically on the screen associated with the UI 114 (FIG. 2). The timer can be inactivated so that the only default displays are provided.

Assuming that an image processing or compression operation is performed, one or both of the reference systems 120, 122 is consulted and, in response to such consulting, the Job ETC is, via step 156, updated. In one example, selected pages of the job are to be image processed and compressed. For each one of the selected pages the appropriate look-up table or algorithm is referenced and the associated Page ETC is updated. After each Page ETC is updated, the Job ETC is updated and if viewing of the updated Job ETC is desired a display of the current Job ETC is provided, via a screen associated with the UI 114 (FIG. 2).

Alternatively, ETC can be calculated only as a function of the number of jobs entering the facsimile queue. Upon entering the queue, JOB ETC is incremented, thereby indicating the ETC is greater.

The system 10 is capable of storing multiple jobs, by way of a queue. More particularly, referring to FIG. 2, information regarding each stored job is preferably stored in a job or heap memory 164, the heap memory comprising suitable nonvolatile memory coupled with the VBus 28 by way of a suitable heap memory control or interface 166. Further details regarding queue systems suitable for use in a digital printing systems may be obtained by reference to U.S. Pat. No. 5,206,735. In practice the queue, which includes at least two types of information, namely the Job ETC for each stored job and a cumulative time, i.e., a "System ETC", required to process the stored jobs, is displayed on the screen associated with the UI 114. It will be appreciated that these times would be adjusted appropriately in accordance with job interrupts of the type discussed in U.S. Pat. No. 5,206, 735. By "process", we refer to the processing required to prepare a document received from a given source for output to a particular system device, and to actually output the document. In the case of a facsimile job, this might include, for example, an estimate of time required to decompose a PDL-described document to a bitmap suitable for facsimile transmission, an estimate for establishing a handshake with an external receiving facsimile device, and an estimated transmission time at an optimum compression ratio.

Figure 7:
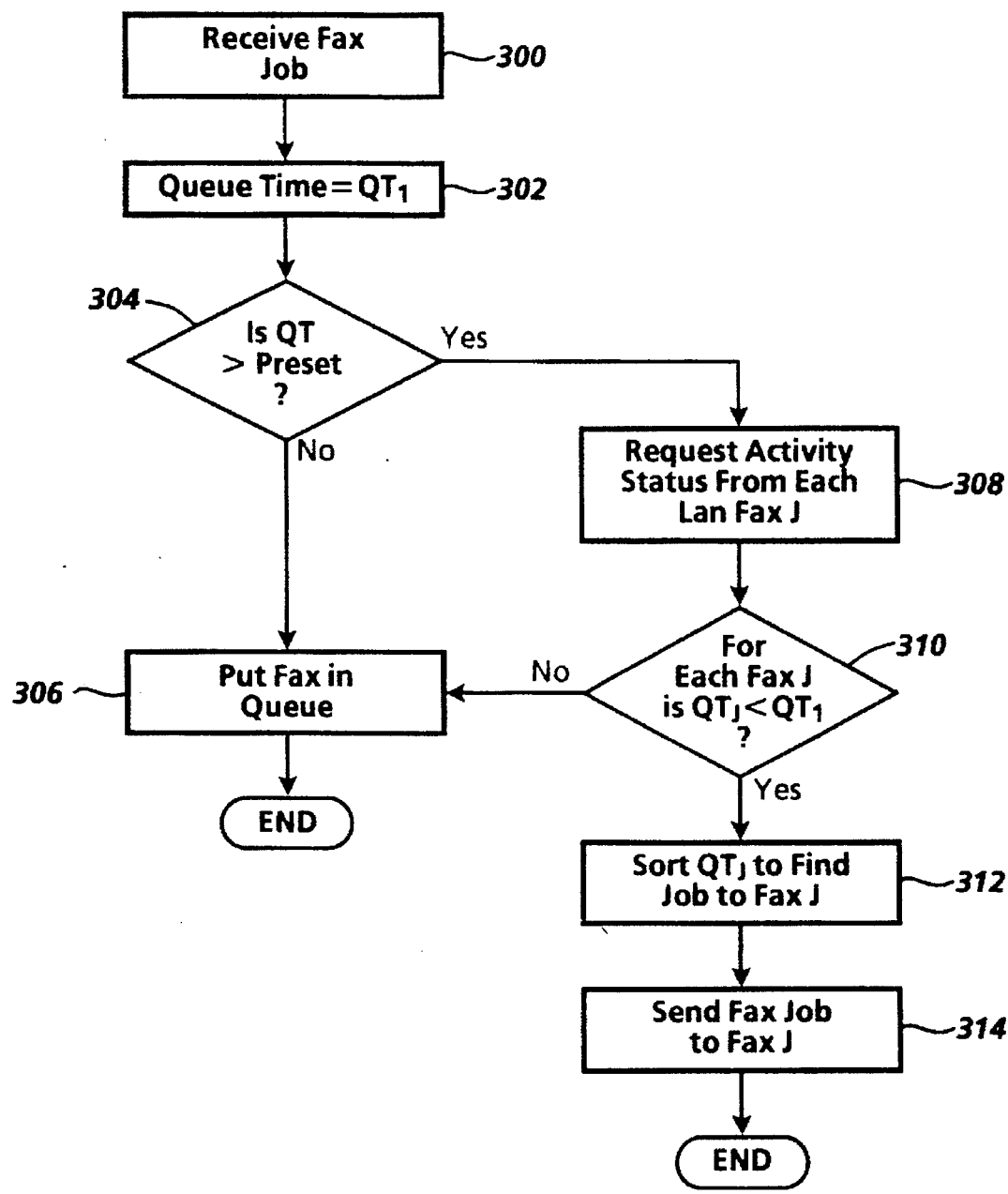
FIG. 7 is a flow chart showing a preferred mode of operation for the present invention.

Referring now to FIG. 7, an exemplary method of operation of the present invention is illustrated in flow chart form. At step 300, a facsimile job is received for any source accessible to the system. Operating under the assumption that facsimile jobs are urgent, at step 302, the sum of ETC's for fax jobs and other functions affecting the particular facsimile job is determined to find the the queue time ($QT_1$) for the input facsimile machine, which provides an approximate transmission time for the fax job. If at step 304, a determination is made that $QT_1$ is less than a preset maximum desired queue time, then at step 306, the facsimile job is placed in the queue for normal operation. If $QT_1$ is greater than the preset value, selected by a user as the maximum time for a facsimile transmission to be in queue, then at step 308, activity reports are requested for other LAN connected facsimile machines. At step 310, for each facsimile machine J, $QT_J$ is compared to $QT_1$. If none of the J facsimile machines have a queue time less than the original machine, then the facsimile job is placed in the input facsimile machine's queue (step 306). However, if there are $QT_J$ that are less then $QT_1$, then the $QT_J$ are sorted to find the minimum value of $QT_J$ at step 312 and the facsimile job is directed via the network to that facsimile machine at step 314.

Variations exist. In one variation, the ETC is simplified to indicate merely the presence or absence of jobs in the queue. If there is a job in the queue, then activity status for net connected machines is checked, and if a non-busy machine is found, the job is transferred. Otherwise it is maintained at the original machine.

In addition to the above, it should be contemplated that at any particular time an owner of a facsimile machine may not wish to have a particular machine tied up in the transmission of a job received from another machine. In such case, the particular facsimile machine may be programmed to respond with an artificially high value for $QT_J$, or an unavailable signal.

In order to minimize the inconvenience to a neighboring department of tying up their facsimile machine with an originator's job, the tie up time may be minimized by pre-formating the job for facsimile transmission prior to transfer. In such a case, decomposition and rasterization of PDL-formatted jobs can occur at the originating machine, to avoid significant use of the neighboring machine's resources.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A method of optimizing facsimile transmission wait time in a device including a facsimile functionality connected in a network system of devices with said facsimile functionality including:

at a first device, receiving and storing job data and job instructions in a job memory for a facsimile job;

determining a transmission time for the facsimile job as a function of previous stored and uncompleted jobs in said job memory;

querying at least one other facsimile machine connected to the network to determine the likelihood of an earlier transmission time at said other facsimile machine;

transferring said facsimile job to said other facsimile machine upon determination of said earlier transmission time.

2. The method as defined in claim 1, wherein said transmission time is determined as a function of the number of previous stored and uncompleted jobs to be transmitted.

3. The method as defined in claim 1, wherein said transmission time is determined as a function of the time required to process said previous stored and uncompleted jobs to be transmitted.

4. The method as defined in claim 1, wherein said querying occurs whenever said transmission time is more than a preset amount of time in the future.

5. The method as defined in claim 4, wherein said querying occurs whenever said preset amount of time in the future is any time greater than zero.

6. The method as defined in claim 1, wherein said other facsimile machine responds to said querying with an approximate transmission time for a new job.

7. The method as defined in claim 6, wherein said other facsimile machine transmission time is determined as a function of the number of previous stored and uncompleted jobs to be transmitted thereby.

8. The method as defined in claim 6, wherein said other facsimile machine transmission time is determined as a function of the time required to process said previous stored and uncompleted jobs to be transmitted.

9. The method as defined in claim 1, wherein the previous stored and uncompleted jobs are copying, printing or scanning jobs.

10. A system providing optimized transmission of facsimile documents by machines with a facsimile transmission functionality connected in a network system of machines with the facsimile transmission functionality including:

means for receiving and storing job data and job instructions in a job memory for a facsimile job;

means for determining a transmission time for the facsimile job as a function of previous stored and uncompleted jobs in said job memory;

means for querying at least one other facsimile machine connected to the network to determine the likelihood of an earlier transmission time at said other facsimile machine;

means for transferring said facsimile job to said other facsimile machine upon determination of the earlier transmission time.

11. The system as defined in claim 10, wherein said transmission time is determined as a function of the number of previous stored and uncompleted jobs to be transmitted.

12. The system as defined in claim 10, wherein said transmission time is determined as a function of the time required to process said previous stored and uncompleted jobs to be transmitted.

13. The system as defined in claim 10, wherein said querying occurs whenever said transmission time is more than a preset amount of time in the future.

14. The system system as defined in claim 13, wherein said querying occurs whenever said preset amount of time in the future is any time greater than zero.

15. The system as defined in claim 10, wherein said other facsimile machine responds to said querying with an approximate transmission time for a new job.

16. The system as defined in claim 15, wherein said other facsimile machine transmission time is determined as a function of the number of previous stored and uncompleted jobs to be transmitted thereby.

17. The system as defined in claim 15, wherein said other facsimile machine transmission time is determined as a function of the time required to process said previous stored and uncompleted jobs to be transmitted.

18. The system as defined in claim 10, wherein the previous stored and uncompleted jobs are copying, printing, or scanning jobs.

* * * * *